United States Patent
Zad Issa

(12) 
(10) Patent No.: US 6,751,313 B2
(45) Date of Patent: Jun. 15, 2004

(54) METHOD AND APPARATUS FOR AN IMPROVED ECHO CANCELLER

(75) Inventor: Mohammad R. Zad Issa, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 279 days.

(21) Appl. No.: 10/003,603

(22) Filed: Oct. 31, 2001

(65) Prior Publication Data

US 2003/0081762 A1 May 1, 2003

(51) Int. Cl.[7] .................... H04M 9/08; H04M 1/00; H04M 9/00
(52) U.S. Cl. .................... 379/406.01; 379/406.05; 379/406.08; 379/406.12; 379/390.02; 379/390.06; 370/289; 370/290; 370/295
(58) Field of Search .................... 379/406.01–406.16, 379/390.02, 390.04; 708/322; 370/286, 203, 208, 210, 289, 290, 295

(56) References Cited

U.S. PATENT DOCUMENTS

| | | | | |
|---|---|---|---|---|
| 5,619,566 A | * | 4/1997 | Fogel | 379/406.07 |
| 5,774,562 A | * | 6/1998 | Furuya et al. | 381/66 |
| 5,818,945 A | * | 10/1998 | Makino et al. | 381/66 |
| 5,912,966 A | * | 6/1999 | Ho | 379/406.05 |
| 6,442,274 B1 | * | 8/2002 | Sugiyama | 379/406.01 |
| 6,546,099 B2 | * | 4/2003 | Janse | 379/406.01 |
| 6,563,868 B1 | * | 5/2003 | Zhang et al. | 375/232 |
| 6,618,480 B1 | * | 9/2003 | Polley et al. | 379/406.05 |
| 2002/0101982 A1 | * | 8/2002 | Elabd | 379/406.01 |
| 2003/0074381 A1 | * | 4/2003 | Awad et al. | 708/322 |

* cited by examiner

Primary Examiner—Binh Tieu
Assistant Examiner—Tuan Pham
(74) Attorney, Agent, or Firm—Jack Jmaev

(57) ABSTRACT

Method and apparatus for an improved echo canceller provide for faster convergence in echo canceling, which also contribute to better voice quality and provide for an increase in the capacity (number of channels) of a multi-channel voice processing products. Whitening filters are used to flatten the spectrum of the signals that pass through the echo canceller. Higher convergence rate is achieved when flattened signals pass through the echo canceller. A reconstruction filter is used to introduce the spectral envelop back into the outbound signal.

19 Claims, 5 Drawing Sheets

METHOD AND APPARATUS FOR AN IMPROVED ECHO CANCELLER

FIELD OF THE INVENTION

This invention relates generally to the cancellation of an echo signal in a voice communication system.

BACKGROUND OF THE INVENTION

In worldwide telecommunications systems, echoes arise in various situations and impair communication quality. Echoes occur when a delayed or distorted version of an original audio signal is reflected back to the source. In telecommunications networks, an impedance mismatch is one factor that contributes to the refection of an audio signal back to its source. The reflected audio signal is a delayed or distorted version of the original signal, which causes echoes in speech communication systems.

A hybrid transformer is typically used to connect a two-wire local telephone exchange to a four-wire long distance or mobile telephone network. The imperfect impedance match exhibited by the hybrid transformer generates the echoed signal. In the past two decades several methods have been used to alleviate the echo problem and improve communication quality. These prior art methods are collectively referred to as echo cancellation.

The long distance or mobile telephone from which a voice signal originates is commonly referred to as the "far-end". The voice signal from the far-end is called the inbound signal and travels through a path called the receive-path. The inbound signal passes through a hybrid transformer located at a local telephone exchange. The hybrid transformer is typically made integral to a device called a Central Office Line Interface Unit. Most of the inbound signal is transferred through the hybrid transformer to the party subscribing to the local telephone exchange that is receiving the phone call. The subscriber using the local telephone exchange is referred to as the "near-end". The hybrid transformer propagates a signal originating at the near-end, commonly called the "near-end signal", to the far-end using a second signal path called the "send-path". An unwanted version of the inbound signal is also coupled into the send path resulting in an echo. This unwanted version of the inbound signal is the echo that needs to be eliminated. The composite of the near-end signal and the reflected inbound signal is referred to as the "outbound signal".

The echo-path-model is a transfer function that describes the amount of the inbound signal that is reflected back into the outbound signal. In order to determine the echo-path-model, echo cancellation systems monitor the inbound signal and compare that inbound signal to the amount of echo signal observed in the send-path. This process can only be accomplished when the send-path is devoid of any other signals. When the near-end is generating a signal, the presence of that near-end signal in the send-path will preclude any estimation of the echo-path-model.

Once the echo-path-model has been derived, an estimate of the echo signal can be calculated. The estimated echo is subtracted from the send-path leaving only the desired near-end signal. Because the resulting transfer function for the echo-path-model is only an estimate of the actual echo transfer function, some of the echo signal will remain in the send-path. This component is called the residual echo.

Echo cancellers usually use some form of filter to implement the echo-path-model. By subjecting the inbound signal to the filter, an estimate of the echo can be derived. The filter itself is normally an adaptive filter that can be based on one of many different adaptation algorithms. One such algorithm is the Least Mean Squares (LMS) algorithm. To support an LMS based implementation of an echo canceller, a coefficient generator is used to sample both the inbound signal and the outbound signal. From these two signals, a set of filter coefficients are determined and fed to the LMS filter. Again, it is important to note that the coefficient generator cannot perform its function if there is a near-end signal present in the send-path.

As the echo canceller continues to operate, the residual echo is used to adjust the coefficients of the LMS filter that models the echo-path. This process is called adaptation. As the adaptation process continues, the coefficients of the filter assume values that more accurately represent the actual echo-path-model. When the coefficients of the filter no longer change, the echo canceller is said to have converged and a near-perfect echo estimate can be derived.

Because the outbound signal is a composite of the reflected component of the inbound signal and the near-end signal, it is impossible to measure the magnitude of the reflected echo signal in the presence of the near-end signal. To overcome this, echo cancellation systems normally comprise a double-talk detector that senses when the near-end signal is active. The double-talk detector sends a signal to the coefficient generator that causes the coefficient generator to suspend the adaptation process.

The actual echo-path in any given system constantly changes as a result of varying physical phenomenon experienced by the system components themselves. Because of these variations, the adaptation process will seldom converge in a perfect echo-path-model.

One way to improve the accuracy of the echo-path-model is to ensure that the adaptation process is performed as quickly so that any temporal variations in the signal line can be reflected in the resulting filter coefficients. By achieving faster convergence, echo-cancellation systems could reduce the amount of residual echo remaining in the send-path. This would contribute to better voice quality in the communications system.

SUMMARY OF THE INVENTION

In one illustrative embodiment of the present invention, an estimate of the spectral distribution of an inbound signal is used as a basis for filter coefficients for a filter disposed prior to a coefficient generator and an echo-estimation filter. This first filter flattens, or whitens the spectrum of the inbound signal used to generate coefficients and is likewise subjected to the echo-estimation filter. The echo-estimation filter actually implements the transfer function for an echo-path-model that describes the system.

In this same illustrative embodiment, a second filter is placed in send-path prior to a subtractor that is used to subtract an estimated echo from the send-path. This second filter uses the same coefficients used by the first filter. The second filter flattens the spectrum of the outbound signal. Hence, the adaptation filter operates on spectrally equalized versions of the inbound and outbound signals. Once the estimated echo is subtracted from the send-path, the outbound signal is fed through a reconstruction filter in order to introduce the original spectral components of the inbound signal into the equalized outbound signal. By flattening the inbound and the outbound signal, the adaptation filter will converge to a solution of an echo-path-model in less time compared to conventional echo cancellation systems. This contributes to better overall echo cancellation quality.

There are, of course, several brute force mechanisms for achieving faster convergence in an echo cancellation system. These brute force methods rely principally on the use of faster processors in the implementation of the adaptive filters. The present invention exploits the fact that certain adaptive filters converge more rapidly when the input signal presented to the filter has been equalized.

The present invention comprises in the first instance a method for canceling echoes in communications systems. When an inbound signal is received, the method provides that the frequency spectrum of the inbound signal should be determined. Determining the spectrum of the inbound signal can be accomplished several ways. In one example embodiment, the inbound signal is actually measured and the spectrum is determined from the measurement. In an alternative embodiment, the general characteristics of the communications system are monitored over some period of time. Based on the historical observations of the communications systems channel, an exemplary spectrum is determined and subsequently used in the process. Once the frequency spectrum of the inbound signal is determined, the inbound signal is itself equalized.

In this example embodiment of the method for canceling echoes, an outbound communications signal is also equalized based on the frequency spectrum of the inbound signal. The outbound communications signal typically comprises at least two components. These are the actual near-and signal that must be propagated to a far-end and some derivative of the inbound communications signal; i.e. the echo component. Using the flattened inbound communications signal and the flattened outbound communications signal, filter coefficients are generated for an adaptive filter. The adaptive filter is a convenient means for implementing the echo-path-model that the communications system exhibits. As such, subjecting the inbound communications signal to the adaptive filter results in an estimate of the echo component found in the outbound communications signal.

Once an estimate of the echo component is generated by the adaptive filter, the method provides for subtracting the estimated echo component from the flattened outbound communications signal. In theory, the outbound communications signal should be devoid of any echo component at this stage. Prior to directing the echo-canceled outbound signal to the far-end, the signal must be reconstructed so as to include the original spectral envelope representative of the original inbound signal. This reconstruction is accomplished based on the spectral distribution for the original inbound signal.

In one example embodiment, the method of the present invention provides for monitoring the frequency spectrum of the inbound signal by buffering the inbound communications signal and then calculating correlation coefficients for the buffered signal. The correlation coefficients are used to create a set of normal equations that can then in turn be solved to determine the frequency spectrum of the inbound signal.

The invention further comprises a system for canceling echoes. In one example embodiment, an echo cancellation system comprises a receiver capable of excepting external signal and then propagating that signal to other components in the system. The echo cancellation system further comprises a spectrum estimator that is able to create filter coefficients. These filter coefficients are used to configure a first whitening filter that accepts the inbound signal from the receiver and creates an equalized rendition of the inbound signal.

The receiver also propagates the inbound signal to a hybrid transformer. The hybrid transformer, having received the non-equalized inbound signal, directs the non-equalized inbound signal to a near-end subscriber. Unfortunately, not all of the inbound signal is propagated to the subscriber. Some of the inbound signal is coupled together with a near-end signal that originates with the subscriber. The inbound signal that is coupled together with the near-end signal is the echo signal that needs to be cancelled. The combination of the near-end signal and the echo signal is called the outbound signal. The invention further comprises a second whitening filter that receives the outbound signal and equalizes the outbound signal based on the filter coefficients created by the spectrum estimator.

The flattened inbound signal and the flattened outbound signal are initially used to create filter coefficients for an adaptive filter that further comprises the invention. The adaptive filter, as configured by these filter coefficients, implements the echo-path-model transfer function that can be used to estimate the amount of echo that should be found in the outbound signal. The invention further comprises a subcontractor that subtracts the predicted echo from the outbound signal.

Because the outbound signal has been equalized, it must be reconstructed in order to reflect the spectral envelope of the original inbound signal. This is accomplished by a reconstruction filter that further comprises the invention and whose filter coefficients may be based on the inverse of the inbound signal's spectral density.

In one example variant of the present invention, the spectrum estimator comprises a spectrum analyzer that actually measures the inbound signal and determines the level of energy at various frequencies. Such a spectrum analyzer may comprise a buffer that captures the inbound communications signal and a correlation calculator that creates correlation coefficients based on the inbound signal stored in the buffer. In this example embodiment, the equation generator creates a set of normal equations based on the coefficients created by the correlation calculator. A matrix analyzer solves this set of normal equations; the resulting matrix defines the spectral distribution of the inbound signal.

In yet a second illustrative variation of the present invention, the spectrum estimator comprises a memory for storing a set of anticipated spectral distributions. In this example embodiment, the invention further comprises a selection unit that selects the estimated spectrum from the memory. The anticipated spectral distributions may be created off-line and can be based on a priori knowledge of the condition of the inbound communications line or can be based on an extrapolation of historical observations of line condition.

In all of these example embodiments, any of the whitening filters can be implemented as filter processors that accepts coefficients from the spectrum estimator. The reconstruction filter may also comprise a filter processor that accepts filter coefficients from the spectrum estimator.

The present invention further comprises a central office line interface that can be used in a telephone-switching center or like application. In one illustrative embodiment, the central office line interface unit according to the present invention comprises a hybrid transformer, the first whitening filter, a second whitening filter, a coefficient generator, an adaptive filter, a subtractor, and a reconstruction filter. The central office line interface unit may further comprise a double-talk detector.

In this example embodiment, the central office line interface unit receives the inbound signal from a remote exchange using a four-wire interface provided by the hybrid transformer. The hybrid transformer directs the inbound signal to a two-wire interface that is used to service a local subscriber. The four-wire interface provided by the hybrid transformer itself comprises a two-wire send-path and a two-wire receive-path. In operation, a near-end signal is received from the local subscriber and is directed into the two-wire send-path by the hybrid transformer.

The inbound signal arrives at the central office line interface unit by way of the two-wire receive-path provided by the hybrid transformer. The first whitening filter equalizes the inbound signal and creates a flattened inbound signal. The second whitening filter concurrently flattens the outbound signal emanating from the hybrid transformer on the two-wire send-path. It should be noted that this outbound signal comprises a near-end signal originating with the local subscriber and an echo signal that is coupled into the send-path by the hybrid transformer.

The coefficient generator receives the flattened inbound signal and the flattened outbound signal and creates filter coefficients for the adaptive filter. The adaptive filter, as configured by these filter coefficients, implements the echo-path-model transfer function that is used to predict the nature and quality of the echo signal coupled into the send-path by the hybrid transformer. In operation, the adaptive filter will create the estimated echo signal. The subcontractor receives the flattened outbound signal from the second whitening filter and subtracts the estimated echo signal therefrom.

In another example embodiment of the present invention, the coefficient generator may continually refine the coefficients that define the echo-path-model in a process called adaptation. This is done by receiving a residual echo signal from the subcontractor. Such adaptation, and for that matter the creation of the original echo-path-model coefficients can only be accomplished in the absence of any near-end signal. This is due to the fact that the near-end signal obscures the echo signal necessary to determine the echo-path-model. The central office line interface unit of the present invention may in this instance further comprise a double-talk detector. The double-talk detector monitors the state of the near-end signal source. When the near-end signal is active, the double-talk detector issues a signal that prevents the coefficient generator from updating its coefficients.

In yet another example embodiment of the present invention, the first and second whitening filters and the reconstruction filter are configured based on the estimate of the spectral distribution of the inbound signal. The estimate of the spectral distribution of the inbound signal may be obtained either through measurement of the inbound signal and a determination of the spectral distribution thereof or by simply anticipating what the spectral distribution of the inbound signal would be under some given circumstance.

BRIEF DESCRIPTION OF THE DRAWINGS

The foregoing aspects are better understood from the following detailed description of one embodiment of the invention with reference to the drawings, in which

FIG. 2 is a block diagram of a conventional echo canceller and its application in the two-wire, four-wire telephone network;

DETAILED DESCRIPTION OF THE INVENTION

The following description is provided to enable any person skilled in the art to make and use the present invention and sets forth the best mode presently contemplated by the inventor for carrying out this invention. Various modifications, however, will remain readily apparent to those skilled in the art, since the generic principles of the present invention have been completely defined.

Telecommunications networks generally consist of two types of telephone connections: two-wire local loops and four-wire trunks. Two-wire local loops are used to connect homes and businesses to a local telephone exchange. Four-wire trunks are used to connect the local telephone exchange to long-distance or mobile telephone networks.

Figure 1:
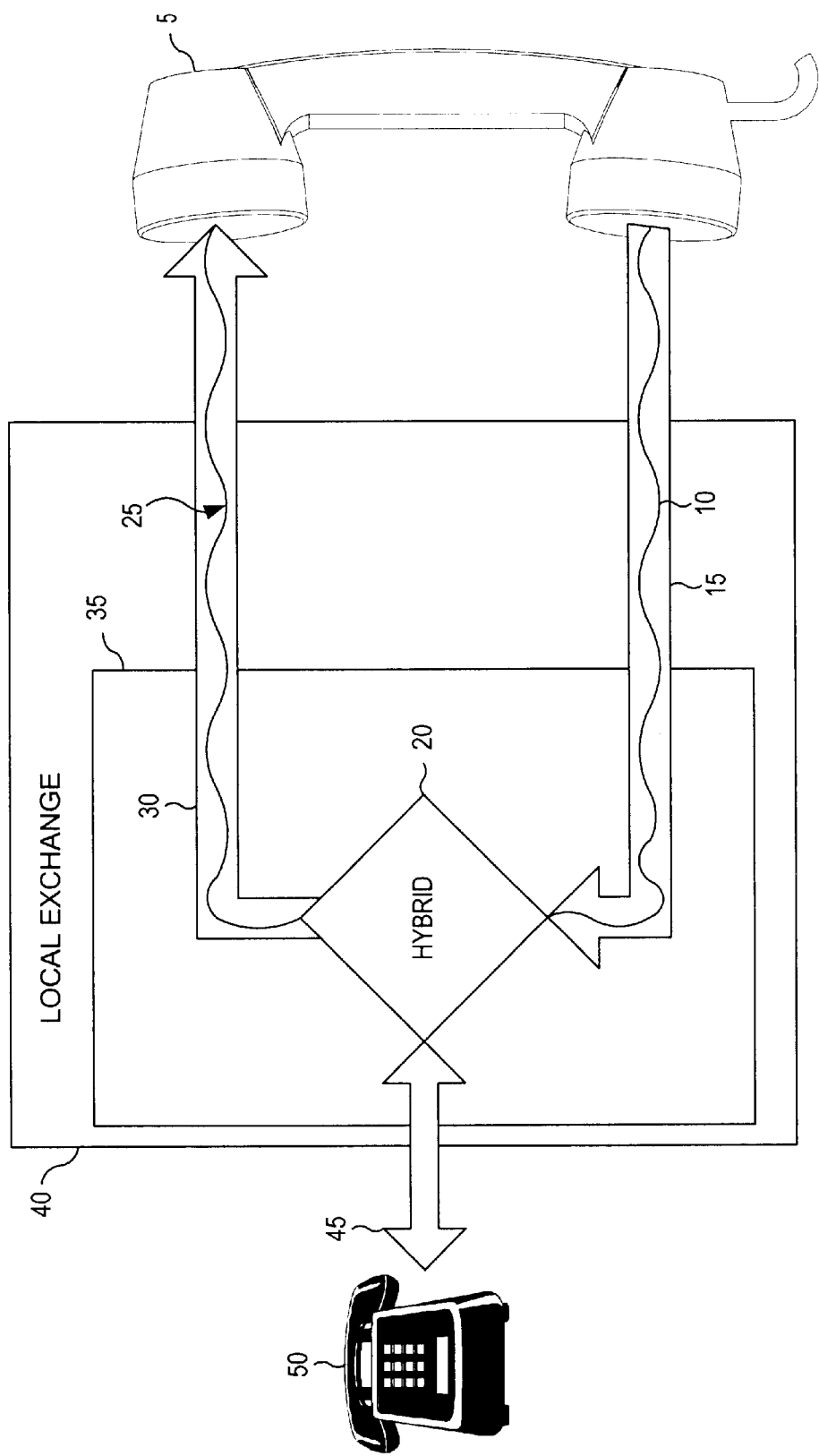
FIG. 1 is a block diagram of a connection between a two-wire local telephone exchange and a four-wire long-distance or mobile telephone network.

FIG. 1 is a block diagram of a connection between a two-wire local telephone exchange and a four-wire long-distance or mobile telephone network. The two-wire local loop 5 consists of a single pair of wires that carry both directions of a conversation. At the local telephone exchange 7, this two-wire pair is connected to a four-wire trunk by using a device called a hybrid transformer 10. The hybrid transformer 10 splits the two-wire local loop into two separate pairs of wires, one for the path that receives an incoming signal, called the receive-path 12, and one for the outbound signal, called the send-path 14. Because the hybrid transformer exhibits imperfect coupling, some of the inbound signal is erroneously leaked into the send-path. In most implementations, the hybrid transformer is integral to a device called a Central Office Line Interface Unit 23.

A voice signal originates from long distance or mobile telephones. These remote signal origins are called far-ends 5. The voice signal from a far-end 5 is called an inbound signal 10 and travels through the receive-path 15. Most of the inbound signal 10 is transferred through the hybrid transformer 20 to the near-end 50. Impedance mismatches cause some of the inbound signal 10 to be coupled through the hybrid transformer 20 back into the send-path 30. This unwanted version of the inbound signal 10 is a component of the outbound signal 25 and is perceived as an echo.

Figure 2:
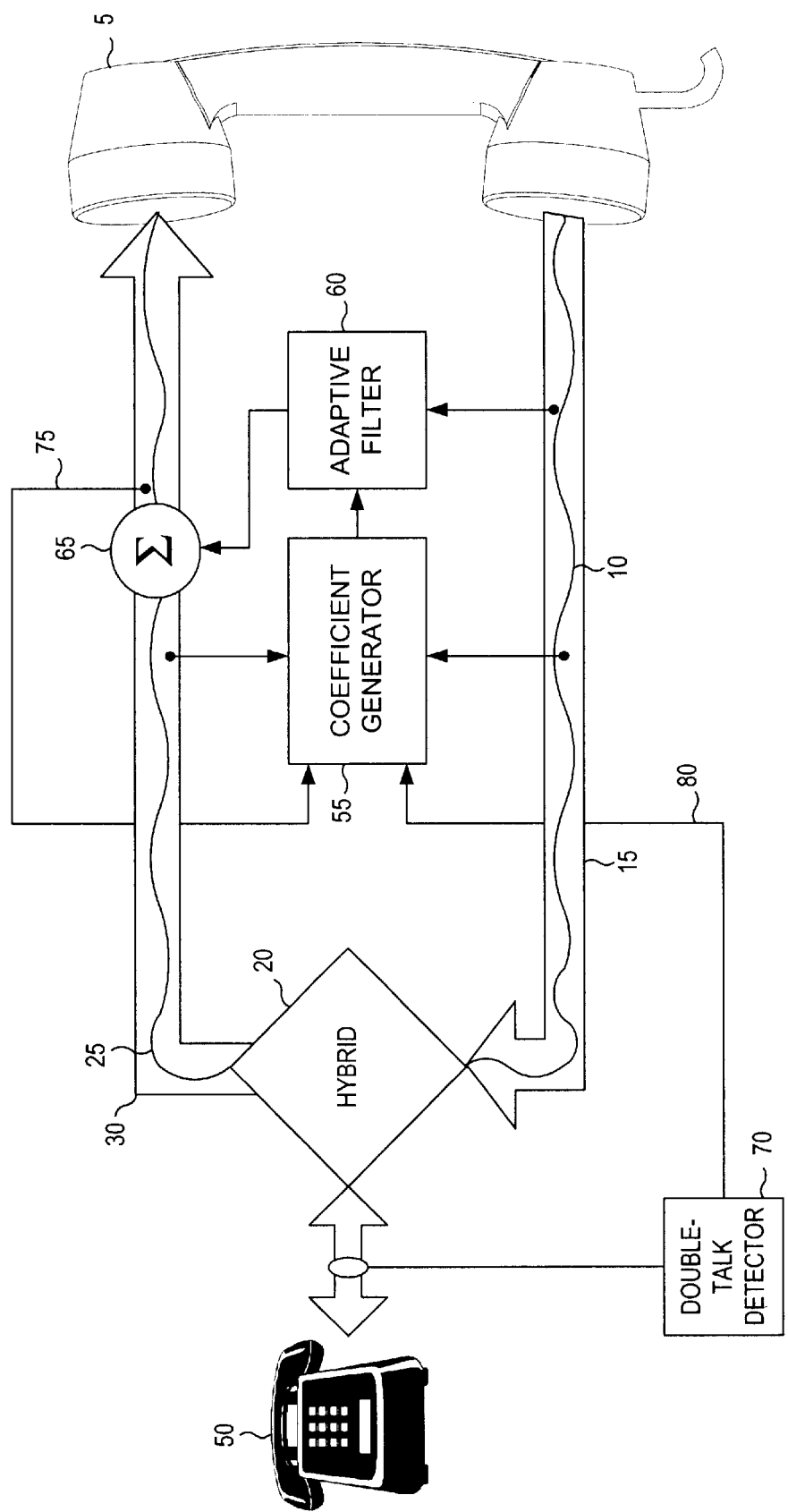
FIG. 2 is a block diagram of a conventional echo canceller of the prior art and its application in a two-wire to four-wire telephone network crossover.

FIG. 2 is a block diagram of a conventional echo canceller of the prior art and its application in a two-wire to four-wire telephone network crossover. A coefficient generator 55 receives signals from the far-end 5 that pass through the receive-path 15 along with the outbound signal 25 passing through the send-path 30. The coefficient generator 55 uses this information to generate coefficients that represent the transfer function of the echo-path-model. Implementation of the transfer function is accomplished using adaptive digital filtering. In almost all echo cancellers, the adaptive digital filtering technique used is based on the Least Mean Squares algorithm.

An adaptive filter 60 implements the echo-path-model transfer function. The inbound signal 10 is fed through the adaptive filter 60. The output of the adaptive filter 60 represents the echo signal that is estimated to be traveling in the send-path 30. The estimated echo is sent to a subtractor 65 that subtracts the estimated echo from the outbound signal 25 in the send-path 30. This results in the elimination of the unwanted echo signal and only the signal from the near-end 50 is sent to the far-end 5.

Because the subtracter 65 can only remove an estimate of the echo, some residual echo component will inevitably remain in the outbound signal 25. The residual echo signal 75 is fed back into the coefficient generator 55. The residual echo is used to adjust the coefficients of the adaptive filter 60 in order to refine the echo-path-model. This refinement process is called adaptation. As the adaptation process continues, the coefficients of the adaptive filter 60 assume values that more accurately represent the actual echo-path. When the coefficients of the adaptive filter no longer change the echo cancellation system is said to have converged. The speed of convergence and the accuracy of the echo-path-model ultimately drive the quality of the echo cancellation system.

The coefficient generator 55 needs both the inbound signal and the echo component of the outbound signal traveling in the send-path in order to compute an estimate of the echo-path. To ensure that the send-path 30 does not contain any near-end signal, a double-talk detector 70 issues a double-talk signal 80 that causes the coefficient generator 55 to suspend the adaptation process. Once the near-end signal is quiescent, the coefficient generator 55 resumes adaptation when the double-talk signal 80 becomes inactive.

Figure 3:
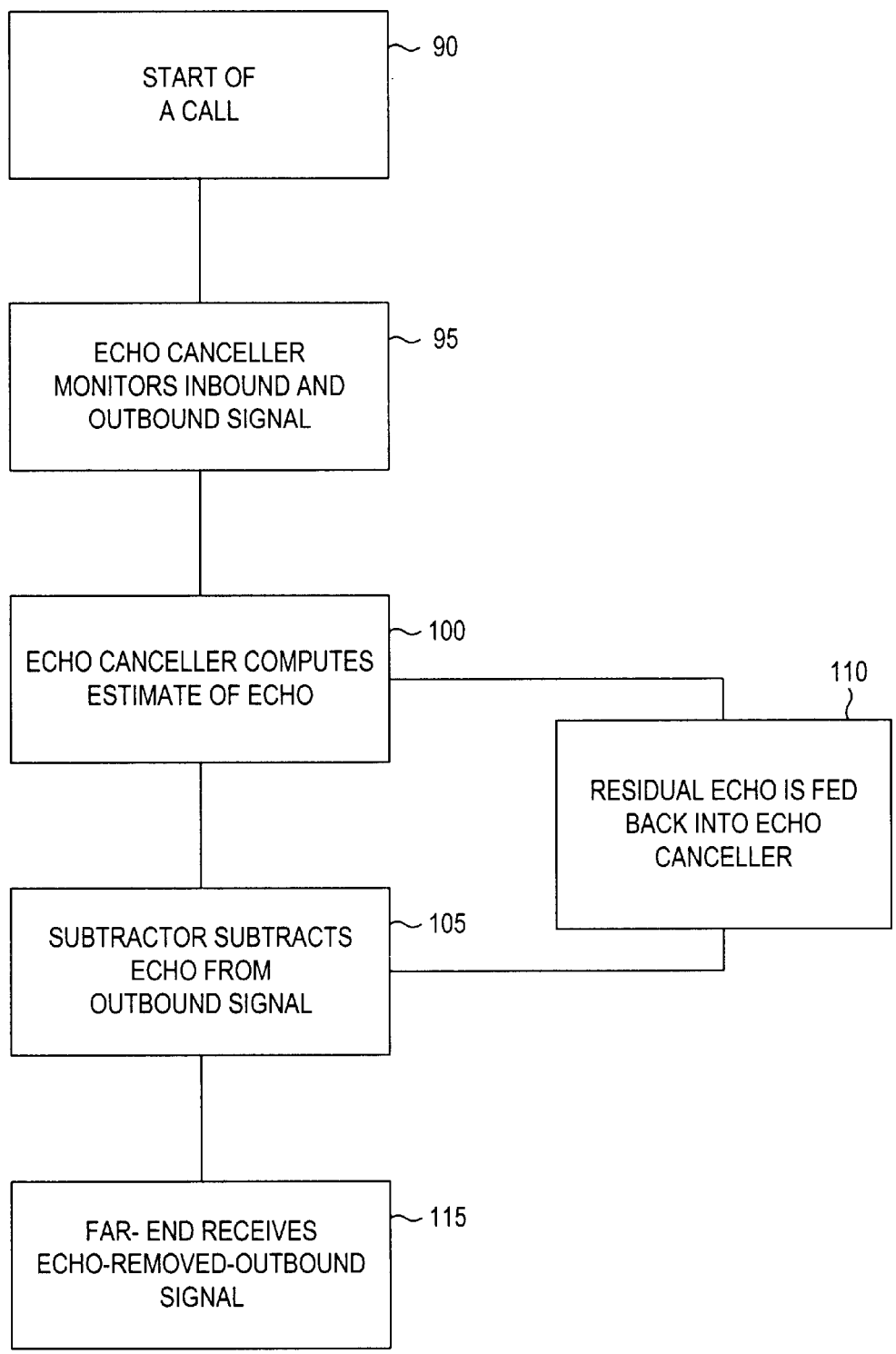
FIG. 3 is a process flow diagram that summarizes the method of echo cancellation in a conventional echo canceller of prior art.

FIG. 3 is a process flow diagram that summarizes the method of echo cancellation in a conventional echo canceller of prior art. At the start of a call (step 90), the echo canceller monitors the inbound and the outbound signals (step 95) and computes an estimate of the echo (step 100). The subtractor eliminates the echo from the outbound signal (step 105).

It should be noted that the echo estimate generated in step 95 is only an estimate of the actual echo that may be included in the outbound signal. This means that subtracting the echo estimate in step 105 will not eliminate the entire echo. Some residual echo component will still remain. To improve echo estimation, the echo canceller uses the residual echo as an error signal to improve the echo estimate (step 110). It should also be noted that if the near-end is active, the adaptation process is suspended.

Figure 4:
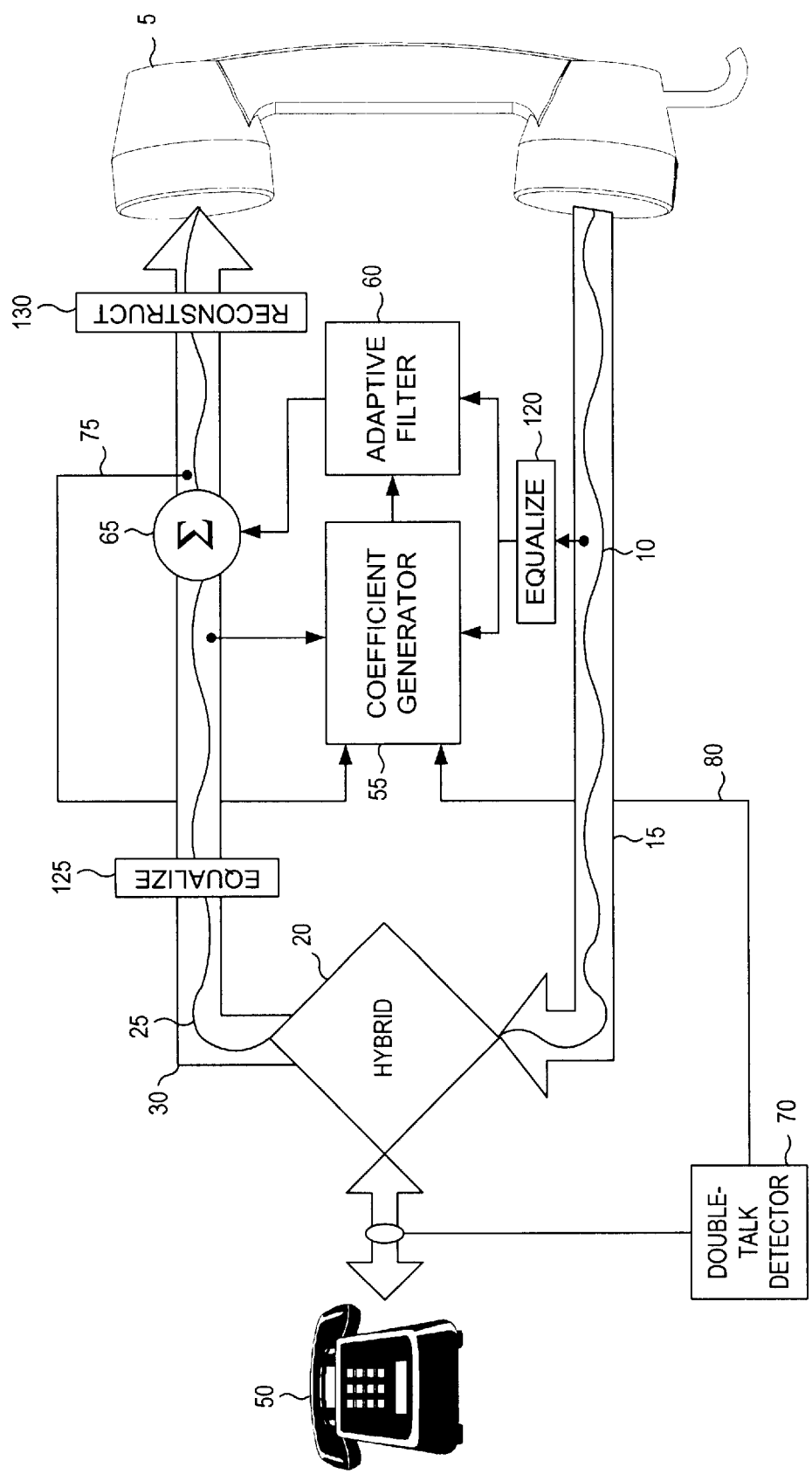
FIG. 4 is a block diagram of one illustrative example of an improved echo cancellation system according to the present invention.

FIG. 4 is a block diagram of one illustrative example of an improved echo cancellation system according to the present invention. The present invention comprises an echo cancellation system comprising a coefficient generator 55, an adaptive filter 60, a double-talk detector 70 and a subtractor 65 and further comprising a first whitening filter 120 disposed between the receive-path 15 and the coefficient generator 55 and the adaptive filter 60. The purpose of introducing the whitening filter is to advantageously exploit the faster convergence time exhibited by the adaptation system as it operates on spectrally equalized signals. The LMS algorithm is known to exhibit faster convergence in this case.

In this illustrative embodiment, the invention further comprises a second whitening filter 125 that receives the outbound signal from the hybrid transformer 20. The coefficients for the first and second whitening filters are derived from the spectral distribution of the inbound signal; either directly measured or anticipated.

The invention further comprises a reconstruction filter 130. Coefficients for the reconstruction filter 130 are also derived from the spectral distribution of the inbound signal in a manner analogous to that of either the first or second whitening filters.

Determining the spectral distribution of the inbound signal can be done in several ways. In the illustrative example presented here, the spectral distribution can be selected from a plurality of exemplary distribution profiles. These can be developed through statistical representation of the inbound signal's spectral history.

In a more sophisticated example embodiment, the inbound signal is sampled and the spectral profile is then calculated. Using some number of samples, stored in a buffer and represented by the sample matrix X(n), a frequency spectrum can be determined in matrix fashion according to the form:

$$r(k) = \frac{1}{C} \sum_{k=1}^{P} x(n)[x(n+k)]$$

where C is a normalization factor, X(n) are the sampled values of the inbound signal. This results in a matrix finally reduced to magnitudes at different frequency values in the form of:

$$\begin{bmatrix} r_0 & r_1 & r_2 & \dots \\ r_1 & r_0 & r_2 & \dots \\ r_2 & r_1 & r_0 & \dots \\ \dots & \dots & \dots & \dots \end{bmatrix} \begin{bmatrix} a_1 \\ a_2 \\ a_3 \\ a_p \end{bmatrix} = \begin{bmatrix} r(1) \\ r(2) \\ r(3) \\ r(p) \end{bmatrix}$$

where $a_x$ are predictor coefficients and r(k) represent the magnitude at the varied frequencies of interest.

The coefficient generator 55 uses the equalized versions of the inbound signal and the outbound signal to create coefficients for the adaptive filter 60. These coefficients represent the echo-path-model transfer function. The adaptive filter 60 implements the transfer function represented by these coefficients. By subjecting the equalized version of the inbound signal to the adaptive filter 60, an estimate of the echo can be determined. The estimated echo is then subtracted from the send-path 30 by the subtractor 65. Any residual echo 75 that might come out of the subtractor is also fed back into the coefficient generator 55 for further adaptation.

Adaptation can continue so long as there is no near-end signal. Once a signal is propagated from the near-end, it becomes impossible to distinguish the echo component of the outbound signal from the near-end signal component. The double-talk detector 70 senses when the near-end 20 is active. The double-talk detector 28 sends a signal to the coefficient generator 55 that causes the coefficient generator to suspend adaptation. As soon as the double-talk detector 70 senses that double-talk is no longer present, it signals the coefficient generator 55 to continue adaptation based on the residual error signal 75.

The illustrative embodiment of the present invention further comprises a reconstruction filter 130. The reconstruction filter 130 introduces the spectral envelop back into the flattened signal that comes out of the subtractor 65. Once the spectral component is folded into the outbound signal 25, it is no longer flat and hence, the far-end 5 receive the signal from the near-end 50 in its original state.

In some embodiments, the filters used in the invention can be implemented in processors. In this case, the first or second whitening filter and the reconstruction filter can be so implemented such that he filter processors accept coefficients based on the spectrum of the inbound signal. Equalization of inbound and outbound signals and reconstruction of the outbound signal can then be accomplished based on the spectral properties of the inbound signal represented by these coefficients.

Figure 5:
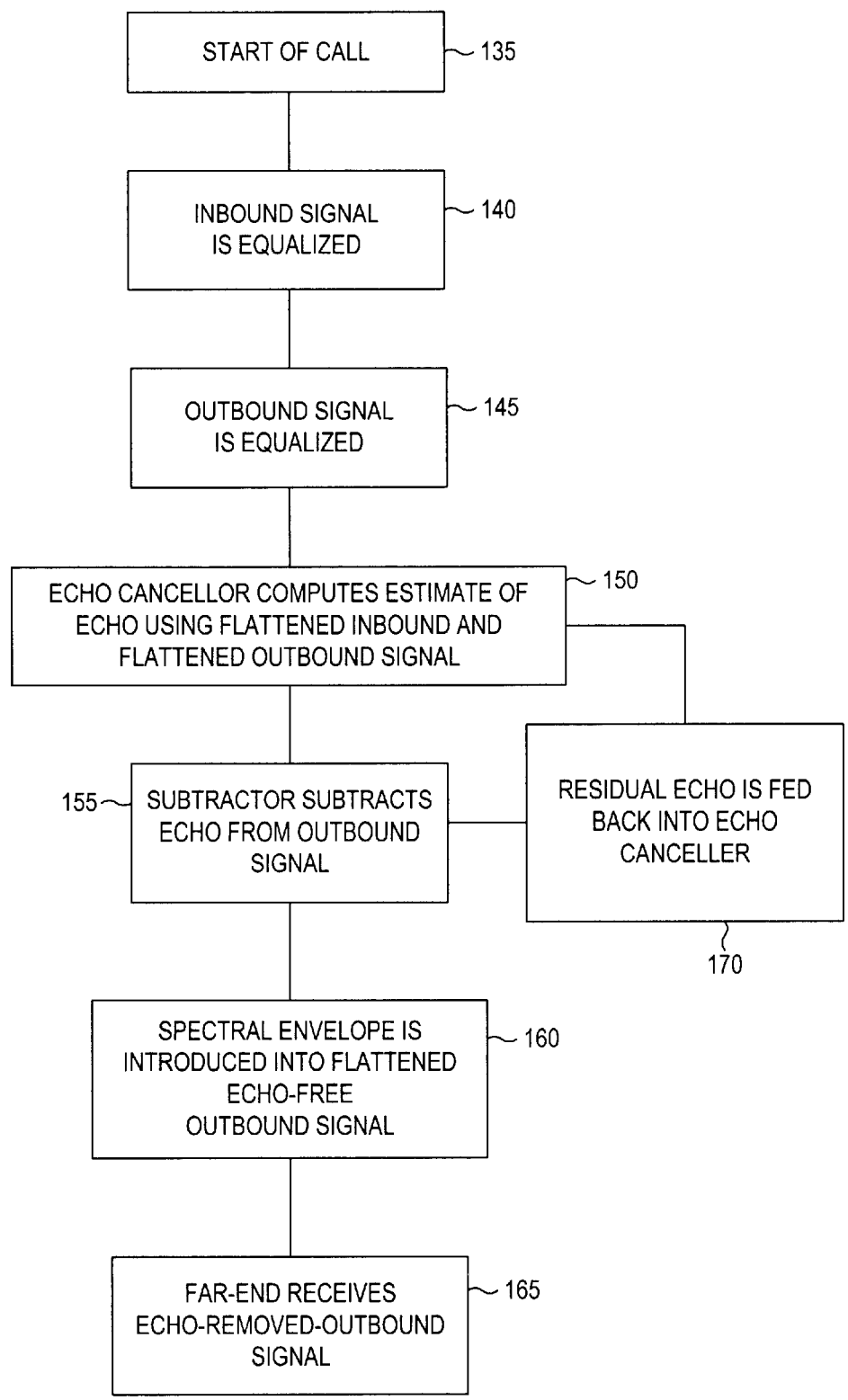
FIG. 5 is a process flow diagram that summarizes one example of the method of echo cancellation of the present invention.

FIG. 5 is a process flow diagram that summarizes one example of the method of echo cancellation of the present invention. At the start of a call (step 135), the inbound signal from the far-end is equalized through a first whitening filter (step 140. The outbound signal is also equalized through the second whitening filter (step 145). The echo canceller then receives both the flattened inbound and the flattened outbound signal and estimates the echo (step 150). The subtractor then subtracts the estimated echo from the flattened outbound signal (step 155). The outbound signal is then reconstructed in order to introduce the spectral envelop back into the signal (step 160).

The far-end receives the echo-cancelled signal (step 165). After the subtractor subtracts the echo from the outbound signal (step 155), any residual echo is fed back into the echo canceller (step 170). The echo canceller then computes a more accurate estimate of the echo, which is then subtracted from the flattened outbound signal. It should be noted that refinement of the echo-path-model (steps 170 and 150) is suspended when the near-end signal source is active.

The method of the present invention is embodied in one illustrative implementation of a central office line interface unit comprising a hybrid transformer that provides a two-wire interface to a local subscriber and a four-wire interface to a remote exchange. The hybrid transformer receives an inbound signal from a receive-path and propagates a near-end signal from the local exchange to a far-end through the send-path.

The central office line interface unit further comprises a coefficient generator and an adaptive filter that form the core of an echo canceller. The coefficient generator receives equalized signals from the receive-path through a first whitening filter and from the hybrid transformer through a second whitening filter that further comprise the central office line interface unit. The coefficients configure the adaptive filter to enable echo estimation.

The central office line interface unit further comprises a subtractor that removes the estimated echo generated by the adaptive filter from the equalized outbound signal. A reconstruction filter introduces the original spectral envelop back into the equalized echo-cancelled outbound signal before it is sent to the far-end.

The central office line interface unit may further comprise a double-talk detector. The double-talk detector monitors the near-end source for any activity. If near-end activity is detected, the double-talk detector signals the coefficient generator to suspend adaptation.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for canceling echoes in communication systems comprising the steps of:

determining the frequency spectrum of an inbound communications signal;

flattening the inbound communications signal based on the determination of the frequency spectrum of the inbound communications signal;

transmitting an outbound communications signal wherein the outbound communications signal comprises at least two components one being a near-end signal and a second being a derivative of the inbound communications signal;

flattening the outbound communications signal based on the determination of the frequency spectrum of the inbound communications signal;

estimating filter coefficients for an adaptive filter based on the flattened inbound communications signal and the flattened outbound communication signal;

estimating the echo component in the flattened outbound communication signal based on the flattened inbound communication signal subjected to the adaptive filter tailored with the estimated filter coefficients;

subtracting the estimated echo component from the flattened outbound communications signal;

reconstructing the flattened outbound communications signal according to the estimated frequency spectrum of the inbound communications signal.

2. The method of claim 1 wherein the step of determining the frequency spectrum of the inbound communications signal comprises the step of monitoring the frequency spectrum of the inbound signal and calculating the spectrum therefrom.

3. The method of claim 2 wherein the step of monitoring the frequency spectrum of the inbound signal and calculating the spectrum therefrom comprises the steps of:

buffering the inbound communications signal;

calculating correlation coefficients based on the inbound communications signal;

generating a set of normal equations based on the correlation coefficients;

solving the set of normal equations in order to obtain an estimate of the frequency spectrum of the inbound communications signal.

4. The method of claim 1 wherein the step of determining the frequency spectrum of the inbound communications signal comprises the step of selecting a frequency spectrum from a set of anticipated frequency spectrums.

5. The method of claim 1 wherein the step of flattening the inbound communication signal comprises the steps of:

receiving an estimate of the frequency spectrum of the inbound communications signal; and filtering the inbound communications signal wherein the filter transfer function is related to the inverse of the estimated frequency spectrum.

6. The method of claim 1 wherein the step of flattening the outbound communication signal comprises the steps of:

receiving an estimate of the frequency spectrum of the inbound communications signal; and filtering the outbound communications signal wherein the filter transfer function is related to the inverse of the estimated frequency spectrum.

7. The method of claim 1 wherein the step of reconstructing the flattened outbound communications signal comprises the steps of:

receiving an estimate of the frequency spectrum of the inbound communications signal; and imparting the frequency spectrum of the inbound communication signal upon the outbound communications signal.

8. An echo cancellation system comprising:

receiver that accepts an external signal and propagates an inbound signal within the system;

spectrum estimator that creates filter coefficients;

first whitening filter that filters the inbound signal to produce a flattened inbound signal;

hybrid transformer that receives the inbound communications signal and the near-end signal and generates an outbound communications signal comprising the near-end signal and a component of the inbound communications signal;

second whitening filter that filters the outbound signal to produce a flattened outbound signal;

adaptive filter that receives the flattened inbound and flattened outbound signals and creates an estimated echo component that is an estimate of the echo present in the flattened outbound communications signal and wherein the adaptive filter coefficients are based on the flattened inbound communications signal and the flattened outbound communications signal;

subtractor that subtracts the estimated echo component from the flattened outbound communications signal; and reconstruction filter that reconstructs the flattened outbound communications signal.

9. The echo cancellation system of claim 8 wherein the spectrum estimator comprises a spectrum analyzer that measures the inbound signal and calculates a frequency spectrum therefrom.

10. The echo cancellation system of claim 9 wherein the spectrum estimator comprises:

inbound signal buffer that captures the inbound communication signal;

correlation calculator that generates correlation coefficients based on the inbound signal buffer;

equation generator that creates normal equations based on the correlation coefficients; and matrix analyzer that solves the normal equations in order to obtain an estimate of the frequency spectrum of the inbound communication signal.

11. The echo cancellation system of claim 8 wherein the spectrum estimator comprises:

anticipated spectrum memory for storing an anticipated spectrum for the inbound communication signal; and selection unit that selects an anticipated spectrum from the anticipated spectrum memory and extracts the anticipated spectrum therefrom.

12. The echo cancellation system of claim 8 wherein the first whitening filter comprises:

filter processor that accepts filter coefficients from the spectrum estimator and equalizes the inbound communication signal according to the inverse of the filter coefficients.

13. The echo cancellation system of claim 8 wherein the second whitening filter comprises:

filter processor that accepts filter coefficients from the spectrum estimator and equalizes the outbound communication signal according to the inverse of the filter coefficients.

14. The echo cancellation system of claim 8 wherein the reconstruction filter comprises:

filter processor that accepts filter coefficients from the spectrum estimator and imparts a spectrum onto the outbound communications signal according to the filter coefficients received from the spectrum estimator.

15. A central office line interface unit comprising:

hybrid transformer that provides a two-wire interface to a local subscriber and a four-wire interface to a remote exchange wherein the four wire interface comprises a two-wire send-path and a two-wire receive-path;

first whitening filter that flattens the inbound signal arriving by the receive-path to create a flattened inbound signal;

second whitening filter that flattens an outbound signal traveling through the send-path to create a flattened outbound signal;

coefficient generator that receives the flattened inbound signal and the flattened outbound signal and generates filter coefficients;

adaptive filter that receives filter coefficients from the coefficient generator and estimates an echo based on the flattened inbound signal and said filter coefficients;

subtractor that subtracts the echo estimated by the adaptive filter from the flattened outbound signal to create an echo-cancelled outbound signal; and reconstruction filter that introduces spectral envelop back into flattened echo-cancelled outbound signal.

16. The central office line interface unit of claim 15 further comprising a double-talk detector that issues a double-talk signal when a near-end signal is detected and wherein the double-talk signal prevents the coefficient generator from updating its coefficients.

17. The central office line interface unit of claim 15 wherein the first and second whitening filter and the reconstruction filter are configured by coefficients based on an estimate of spectral distribution of the inbound signal.

18. The central office line interface unit of claim 17 wherein the estimate of spectral distribution of the inbound signal is obtained through measurement of the inbound signal and determining the spectral distribution thereof.

19. The central office line interface unit of claim 17 wherein the estimate of spectral distribution of the inbound signal is an anticipated spectral distribution.

* * * * *